Nov. 30, 1971  B. LARKFELDT ET AL  3,623,420

AIR SUPPLY DEVICE

Filed Dec. 24, 1969

INVENTORS:
BIRGER LARKFELDT
KRISTER LARSSON

BY Howson & Howson

ATTYS.

3,623,420
AIR SUPPLY DEVICE
Birger Larkfeldt, Odensjo, and Krister Larsson, Jonkoping, Sweden, assignors to Aktiebolaget Svenska Flaktfabriken, Stockholm, Sweden
Filed Dec. 24, 1969, Ser. No. 887,946
Claims priority, application Sweden, Feb. 3, 1969, 1,386/69
Int. Cl. G03c 9/00
U.S. Cl. 98—40 A
9 Claims

ABSTRACT OF THE DISCLOSURE

For admitting ventilating air into a room with a low generation of sound, a plate having a plurality of passageways therethrough disposed obliquely to the axis of the opening in which the plate is mounted. Each passageway comprises a frustoconical bore which terminates in the outer surface of the plate in a spherical protrusion whose center of curvature coincides with the axis of the associated bore so that the opening is perpendicular to the axis of the bore and is circular. The preferred embodiment comprises a plurality of such plates which are circular and have a plurality of bores whose axes are parallel to one another so that the direction of injection of air through the plate may be altered by rotating the plate on its circular axis.

---

This invention relates to an air injection device intended preferably for supplying ventilation air to rooms with high requirements as regards a low sound level, and comprising one or several plates, each of which covers a supply opening for the ventilation air and is provided with a plurality of holes in the form of obliquely directed outflow passageways with circular cross-section.

Ventilation installations in hospitals have to satisfy high requirements that pre-treated outside air is supplied in a fully hygienic way through room apparatus or other supply means in nursing rooms and the like. For sanitary reasons, it must not be allowed that secondary air from the rooms flows through the room apparatus in such installations. Such flow of secondary air, however, is usual in other types of ventilation installations where room apparatus of induction type are used. In hospitals the room air often is polluted by bacteria etc. and, for this reason, the air altogether is to be prevented from penetrating as secondary air into ventilation apparatus, because otherwise colonies of bacteria easily would adhere there and additionally deteriorate the room climate. Aside from the fact that induction apparatus must not be used, the room apparatus must neither be provided with conventional injection gratings which have a low pressure drop for the air, because secondary air streams have a high tendency of being sucked through such gratings into the apparatus and thereafter to follow with the ventilation air into the room. Instead, injection nozzles with a relatively strong throttling of the air stream have to be used whereby secondary air streams of the aforementioned kind are prevented. However, a strong throttling of an air stream injected into a room gives rise to great difficulties of avoiding inconveniencies from a sound point of view, because in most cases an injection nozzle with a high pressure drop has a high natural sound. This is of great disadvantage, particularly for apparatus in hospital rooms.

The invention has as its object to produce an air injection device of the aforesaid type adapted to inject ventilation air preferably directed with a strong throttling of the air flow, which injection device has a low natural sound and in addition brings about an effective co-ejection of ambient room air. The device according to the invention is characterized in that of every plate the surface facing the room is provided with a plurality of spherical bulgings, and that in the plates the central line of every outflow passageway coincides with a radius of the spherical surface of a corresponding bulging, and that the outflow passageways converge in the direction to that surface of the plate in question which faces the room. It has been found that this design of the plate or plates of the air injection device renders possible a very quiet supply of the ventilation air and, in addition, a rapid admixture of room air to the injected air stream because of the effective co-ejection of the room air. Said rapid admixture is of high importance for the cooling or heating of the room when the injected ventilation air has a temperature different from that of the room air, because high temperature gradients in the room can be avoided by said admixture. The very low natural sound of the injection nozzle and the effective co-ejection of room air can be assumed to have their reason in that the oblique outflow passageways of the plates converge in the flow direction and terminate with a circular mouth perpendicular to the longitudinal direction of the passageway in question and located in the spherical surface of the bulging in question. The converging shape of the passageways counteracts turbulence, and thereby sound production as well as effect losses in the air streams, by eliminating substantially all tendencies of eddy making at the passageway walls. A cone angle of approximately 50° was found to produce the lowest natural sound, but for space and other practical reasons in most cases a smaller angle has to be chosen in practice. The perpendicular orientation of the circular passageway mouths in relation to the longitudinal direction of the passageways eliminates the deflection which would take place, accompanied by effect demanding and sound producing turbulences, if that surface of the injection device plates which faces the room were plane and have passageway mouths directed obliquely in relation to the longitudinal direction of the passageways.

An expedient embodiment of the invention with a plurality of outflow passageways is characterized in that every plate is of circular shape and mounted rotatably in the supply opening in question, and that all oblique outflow passageways are parallel relative each other. Thereby it is possible simply and accurately to adjust the injection direction from each of the plates of the air injection device, because every plate can be turned so as to assume any desired position in its plane. The air streams then can so be directed that they counteract draft in the room, for example to a window.

In order to improve still more the flow pattern in the outflow passageways of the plates, the inlet of every outflow passageway can be located in a portion of the plate side facing from the room, the surface of which portion forms a right angle with the longitudinal direction of the passageway. A similar effect is obtained when the passageways are given a well rounded inlet.

The spherical bulgings of the plates preferably can be arranged so as to form one or several concentric circles whereby the common air-stream from all outflow passageways of the plate in question will be well concentrated and symmetric. This is of value for an accurate adjustment of the desired direction of the air stream composed of injected fresh air and co-ejected room air.

The invention is described in greater detail in the following, with reference to the accompanying drawing showing by way of example an embodiment of an air injection device for applying the idea of the invention.

Figure 3:
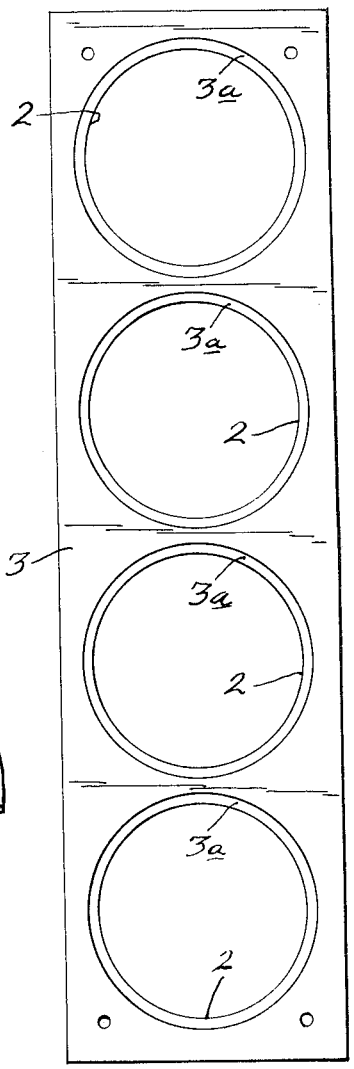
FIG. 3 shows a metal sheet with a plurality of supply openings, each of which is intended to be covered by one of the plates of the air injection device, said metal sheet being, for example, the top piece of a room apparatus.
Figure 2:
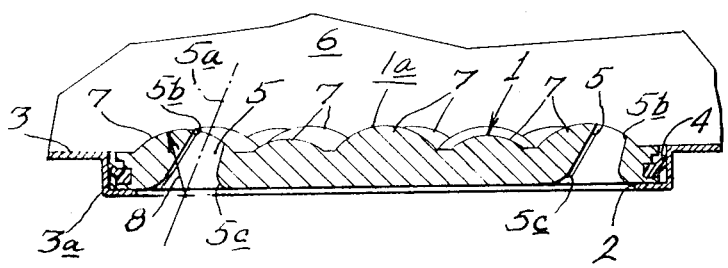
FIG. 2 shows a cross-section through the plate along the line II—II in FIG. 1, said plate being provided with a sealing ring and mounted in a supply opening for ventilation air.

In the drawing, 1 designates one of the plates of the air injection device. The plate 1 is intended, together with three other similar plates, to cover the supply openings 2 for ventilation air (FIG. 3) in a metal sheet 3. The plate 1 when it is mounted in one of the supply openings 2 is supported on an edge 3a sunk below the level of the metal sheet 3. Said edge 3a extends around said opening and is retained therein by a sealing ring 4. The plate 1 is provided with a plurality of holes in the form of obliquely directed outflow passageways 5 with circular cross-section.

According to the invention the plate surface 1a facing the room 6 is provided with a plurality of spherical bulgings 7. Furthermore, the central line 5a of every outflow passageway 5 coincides in the plate 1 with a radius 8 of the spherical surface of a corresponding bulging 7. The outflow passageways 5, besides, converge in the direction to the plate surface 1a facing the room, i.e. in the direction of the air flow. Owing to the fact, that the central line 5a of the outflow passageways 5 coincides with radii 8 of the spherical surfaces of the bulgings 7, the mouths 5b of the passageways 5 in the plate surface 1a facing the room are of circular shape and perpendicular to the longitudinal directions of the passageways, so that the air jets are not deflected at their outflow from the passageways.

The plate 1 has circular shape and thereby is mounted rotatably in the supply opening 2. As, besides, the oblique outflow passageways 5 are parallel relative each other, the injection direction for the collected air stream from the plate can be adjusted in a simple and accurate way. The inlets 5c of the outflow passageways are well rounded, so that the air enters the passageways without giving rise to turbulence.

Figure 4:
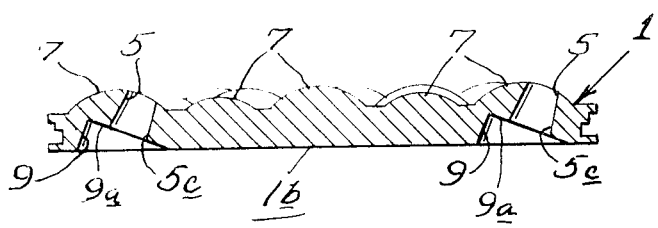
FIG. 4 shows a second embodiment of the plates of the air injection device and represents—as FIG. 2 for the first embodiment—a cross-section along the line II—II in FIG. 1 without, however, including the sealing ring and the metal sheet with the supply opening.

FIG. 4 shows a second-embodiment of the plates 1 of the air injection device where the inlet 5c of every outflow passageway 5 is located in a portion 9 of the plate side 1b facing from the room, the surface 9a of said portion forming a right angle with the longitudinal direction of the passageway 5. Thereby an improvement of the flow pattern in the outflow passageways is obtained which is equal to that obtained if the inlets of the passageways were well rounded.

Figure 1:
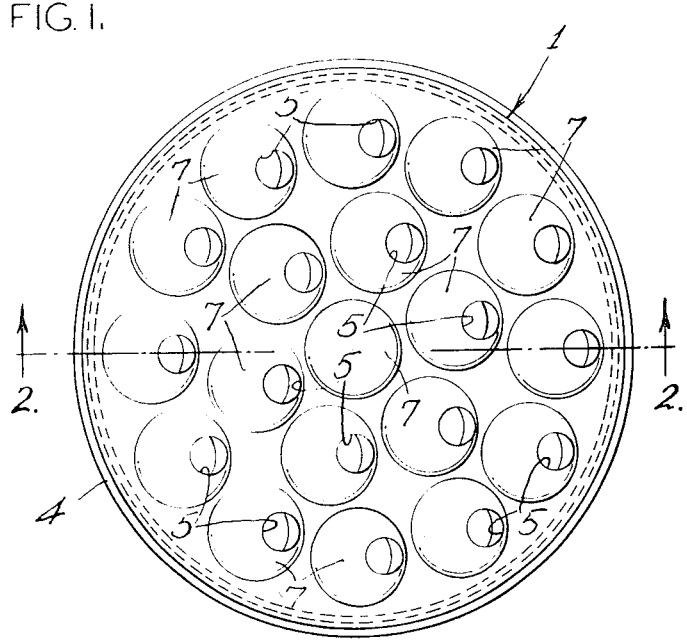
FIG. 1 shows one of the plates of the air injection device from the side to face the room.

The spherical bulgings 7 of every plate, except one bulging, are arranged in two concentric circles (FIG. 1). One bulging is placed in the centre of the plate. It is not necessary that all bulgings are provided with outflow passageways 5, but the number of passageways may vary from case to case, depending a.o. on the air quantity to be injected. In the embodiment shown all bulgings, except that in the plate centre, are provided with outflow passageways.

Exemplifying embodiments of the invention have been described with reference to the drawing. The invention, however, may be varied within the scope of the following claims.

We claim:

1. For an opening supplying ventilation air to a room having a requirement for a low sound level, an injection device comprising at least one plate disposed across said opening with an inner surface confronting the supply and an outer surface confronting the room, said plate having a plurality of bores therethrough, each bore having an axis oblique to the axis of the opening, each bore being frusto-conical with a circular cross section converging from the inner surface toward the outer surface, said outer surface having a separate spherical protrusion for each bore, the center of curvature of each protrusion coinciding with the axis of said bore whereby the outer end of said bore terminates in the spherical surface of said protrusion in a circular opening perpendicular to the axis of said bore.

2. An air injection device according to claim 1 wherein said plurality of bores are parallel to one another so as to direct all of the injected air into the room in substantially one direction.

3. An air injection device according to claim 2 wherein said plate is circular so as to permit angular adjustment of said direction of injection by rotation of said plate.

4. An air injection device according to claim 1 wherein the inner surface of said plate is substantially planar whereby the inner end of each bore is non-circular.

5. An air injection device according to claim 1 wherein the inner surface is a non-planar, each bore terminating at its inner end in circular opening disposed in a planar surface disposed perpendicular to the axis of said bore, each said planar surface being disposed in a separate recess in the non-planar inner surface of said plate.

6. An air injection device according to claim 1 wherein said spherical protrusions on the outer surface of said plate are disposed in at least one circular array.

7. An air injection device according to claim 6 wherein said plate is circular and concentric with the circular array.

8. An air injection device including a series of circular plates, each plate made in accordance with claim 1 and having a plurality of bores therein disposed parallel to one another, said plates being rotatable independently of one another to provide selective directions of air injection.

9. An air injection device according to claim 1 wherein said converging bore meets the spherical surface of the protrusion in a sharp edge.

References Cited

UNITED STATES PATENTS

| | | | |
|---|---|---|---|
| 1,045,469 | 11/1912 | Van Zandt | 239—559 |
| 1,633,531 | 6/1927 | Keller | 239—559 |
| 1,981,976 | 11/1934 | Wem | 239—567 X |
| 2,528,130 | 10/1950 | Frisk et al. | 98—40 A |
| 2,965,310 | 12/1960 | Gettelman | 239—559 X |
| 3,304,009 | 2/1967 | Hutton | 239—567 X |

LLOYD L. KING, Primary Examiner

U.S. Cl. X.R.

239—559, 567